Figures 1, 2, 3, 4, 5:
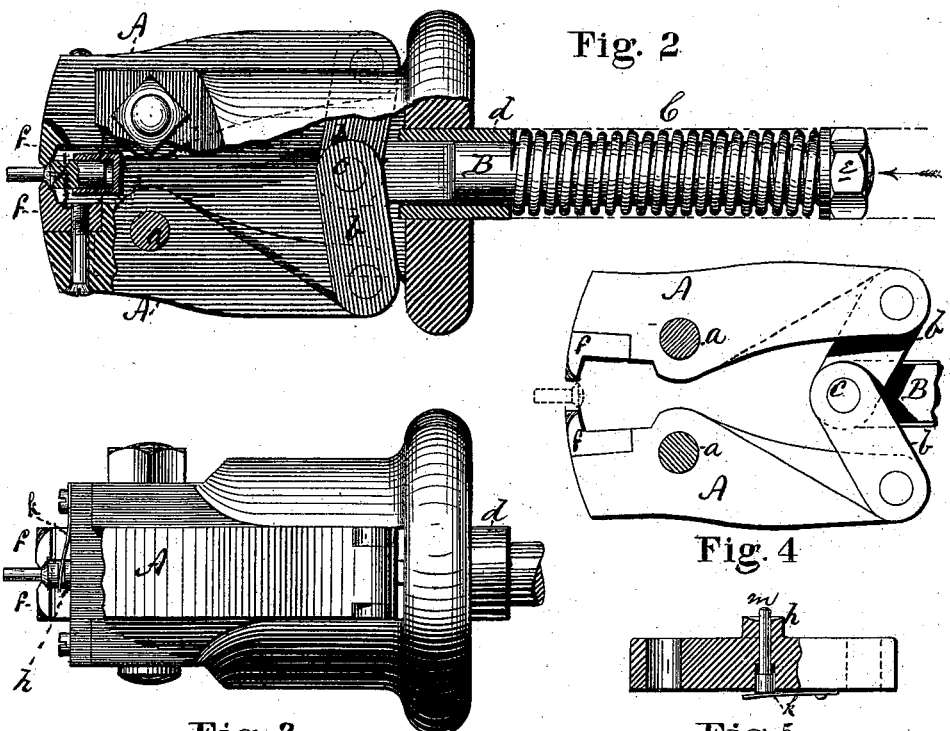

E. PARKER & H. K. JONES.
Chuck for Metal Screw-Machine.

No. 210,221. Patented Nov. 26, 1878.

WITNESSES. INVENTOR.

UNITED STATES PATENT OFFICE.

EMERY PARKER, OF NEW BRITAIN, AND HORACE K. JONES, OF HARTFORD, ASSIGNORS TO THE RUSSELL & ERWIN MANUFACTURING COMPANY, OF NEW BRITAIN, CONNECTICUT.

IMPROVEMENT IN CHUCKS FOR METAL-SCREW MACHINES.

Specification forming part of Letters Patent No. 210,221, dated November 26, 1878; application filed March 19, 1878.

*To all whom it may concern:*

Be it known that we, EMERY PARKER, of New Britain, in the county of Hartford, and HORACE K. JONES, of Hartford, in the county of Hartford and State of Connecticut, have invented certain new and useful Improvements in Screw-Machines; and we do hereby declare that the following specification, taken in connection with the drawings making a part of the same, is a full, clear, and exact description thereof.

In machines which employ a die for cutting the thread it is necessary that the blank should be held in the jaws of the spindle with a very severe gripe.

Our improvements are applicable to any description of screw-cutting machines, but are of particular value in such as embody dies, and are adapted to make metal or machine screws.

The object sought by us is a pair of jaws which can exert a firm gripe upon the screw-blank without liability of injuring its head, and such a construction thereof as will secure the centralizing of the blank within the jaws and the discharge of the blank as soon as fully released.

Our invention consists, mainly, in the combination, with a pair of griping-jaws which are fitted to engage with the shank of a blank beneath its head, of a device which performs the double service of co-operating with the jaws for holding the blank, and also of ejecting the blank from the jaws when they are opened; and our invention further consists in a screw-blank holder embodying in combination a pair of jaws, a centralizing-seat, and an ejector.

We are aware that jaws have been heretofore fitted to engage with a blank below its head, and also that ejectors have been heretofore employed in connection with the clamping devices in shaving and nicking machines; but we know of no prior combination of ejector and jaws in which the ejector co-operates with the jaws for more securely holding the blank; nor do we know of any prior ejector provided with a concave or otherwise recessed seat for centralizing the blank in the jaws.

In the drawings, Figure 1 is a front view with the jaws in a horizontal plane. Fig. 2 is a longitudinal section with the jaws in a vertical plane. Fig. 3 is a side view with one of the jaws partially cut away to show the discharger. Fig. 4 is a sectional view, showing the jaws opened to receive a blank. Fig. 5 is a modification of structure to be referred to.

A A are two levers, corresponding in appearance quite nearly with the ordinary jaws for holding blanks. They are mounted in the spindle-head upon strong fulcrum-pins $a$, and work in suitably-shaped recesses or slots. The rear ends of these levers are connected by links $b\ b$, of equal length, having a common hinge-pivot, $c$, in a sliding central bar, B. This bar passes through a collar, $d$; and between the end of this collar and the face of a nut, $e$, on the end of the bar is arranged a coiled spring, C, the tension of which can be increased by screwing up the nut $e$, but the tendency of which is always to pull upon the central bar B in a direction which will bring the links $b\ b$ more nearly in a straight line, and consequently tend to spread the rear ends of the levers A A farther apart.

The front ends of the levers A A are furnished with hook-shaped clamps $f\ f$ of hardened steel. The office which these devices are to perform is to hold the screw-blank by the under side of the head against a seat or socket in which the top side of the blank's head is seated. For this purpose the inner edges of the clamps are sections of a hollow cone, or are otherwise shaped so as to conform to the beveled or conical shape of the under side of the head, and each embraces, as near as practicable, in view of the necessity for using the same spindle for blanks varying somewhat in size, a little less than one-half the usual conical under portion of the head.

In the instance shown in Fig. 2, $h$ is a seat or socket shaped generally to correspond with the form of the top of the head of the screw-blank. In this instance it is shown concave to accommodate a round-headed screw; but it may be a recess with tapering sides.

The concave or an inclined sided seat will secure the centralizing of the blank in the jaws when inserted, whether the top of the head of the blank be round or flat. This seat is set in a hollow cylinder, $i$, or other suitable guide, so as to preserve its centrality in the spindle, and is capable of a slight movement longitudinally.

A spring, $k$, is applied in any convenient way so as to give it an impulse forward when the seat is released from any force which has pressed it backward. The office of this seat is threefold. It forms one of the members of the clamp to hold the screw-blank. Its concave or recessed face acts, in combination with the members $ff$ of the clamp, to centralize the blank, and it serves, by its movement forward under the impulse of the spring $k$, to eject the finished screw when the same is to be discharged from the spindle.

In the organized machine a forward movement is given at the proper times to the bar B by any suitable device familiar to constructors of screw machinery. The effect will be that the ends of the longer arms of the levers A A will be brought nearer together, and the hooked clamps $ff$ will open, as shown in Fig. 4. The proper feeding mechanism now inserts a blank so that its head will bear against the seat $h$, and, the bar B being thereupon moved rearward by the action of the spring C, or by other suitable means, the members $ff$ of the holding-clamps are moved toward each other and in the arc of a circle, and engaging, as above described, with the beveled under portion of the head, force the blank against the seat $h$ and carry it and the seat backward until the seat comes to a solid bearing. The blank is by this means firmly held from turning in the spindle by pressure applied against the top surface of the head of the blank, in combination with pressure applied in the opposite direction against the under side of the head.

The advantages of this method of holding a blank in the spindle of a screw-machine are that the head is not crushed and the nick is left uninjured. The form of the seat tends, in connection with pressure applied in this way, to centralize the blank, and from the great extent of frictional holding-surface such extreme pressure is not necessary as would be required in case the blank were held in griping-jaws as heretofore constructed, whereby there is no sticking of the blank when it ought to be discharged. When the clamps $ff$ are released the spring-seat $h$ throws the screw outward in a well-understood way.

At Fig. 5 a modification is shown of the discharger for the finished screw. In this instance the seat $h$ is immovable, and the ejection of the screw is effected by the pin $m$, which occupies the axis of the seat and projects beyond the face of the seat in consequence of the pressure of the spring $k$. When a blank is inserted into the spindle this pin is pushed backward, and bears with the full pressure of the spring behind it against the blank's head. So soon as the holding-clamps open to release the screw the spring and the pin act to throw out the screw in a well-understood way.

While we have shown and described a spindle in which the hook-faced clamps move in the arc of a circle and carry the blank in so moving against a seat, it is evident that the construction and arrangement of the members which are to co-operate to form a clamp for holding the blank by pressure applied against the top and the under side of the head may be greatly varied. Thus the members which are to bear against the under side of the head may be arranged to move in a line transversely with the longitudinal axis of the spindle, and the seat may be arranged to have a forward movement and in the line of the axis of the spindle.

It will be within our invention if the construction is such that the screw-blank is held by clamping-pressure applied against the top and under side of the head, whether to effect such result one of the members of the clamp is stationary and the other is movable, or whether both members have a movement relatively to each other to permit the insertion of a blank and the holding of it in the way described after it has been inserted, provided said clamping device be also provided with a centralizing-seat and an ejector.

What we claim as our invention, and desire to secure by Letters Patent, is—

1. The combination, in a screw-blank holder, of a pair of jaws, fitted to receive the head of a blank and to engage with the shank thereof beneath the head, with an ejector, which co-operates with the jaws in holding the head of the blank, and also operates as an ejector, substantially as described.

2. A blank-holder for screw-threading and pointing machines embodying, in combination, a pair of griping-jaws, a recessed seat for the head of a blank, and an ejector, substantially as described.

EMERY PARKER.
HORACE K. JONES.

Witnesses:
H. E. RUSSELL, Jr.,
THEO. E. SMITH.